United States Patent [19]

Bender et al.

[11] Patent Number: 4,631,709

[45] Date of Patent: Dec. 23, 1986

[54] LOW COST SONOBUOY

[76] Inventors: Roland A. Bender, 538 Norris Dr., Furlong, Pa. 18925; Lawrence R. Howarth, 8020 Colfax St., Philadelphia, Pa. 19136; Lawrence F. Coar, 329 Juniper St., Warminster, Pa. 18974

[21] Appl. No.: 630,628

[22] Filed: Jul. 13, 1984

[51] Int. Cl.$^{4}$ ........................ B63B 22/00; B64D 19/00

[52] U.S. Cl. .................................... 367/4; 244/138 R

[58] Field of Search ............... 367/3, 4, 173; 343/709; 244/138 R, 147, 151

[56] References Cited

U.S. PATENT DOCUMENTS

| | | | |
|---|---|---|---|
| 2,593,432 | 4/1952 | Freas | 367/4 |
| 2,629,083 | 2/1953 | Mason et al. | 367/3 |
| 2,968,819 | 1/1961 | Jenson | 367/4 |
| 3,315,285 | 4/1967 | Farmer | 441/1 |
| 3,377,615 | 4/1968 | Lutes | 367/4 |
| 3,436,775 | 4/1969 | Schlosser et al. | 441/33 |
| 3,671,928 | 6/1972 | Schultz | 367/4 |
| 4,209,151 | 6/1980 | Saunders | 367/4 |
| 4,349,824 | 9/1982 | Harris | 343/709 |
| 4,357,688 | 11/1982 | Dale et al. | 367/4 |
| 4,358,834 | 11/1982 | Swenson | 367/4 |
| 4,402,069 | 8/1983 | Miller et al. | 367/176 |

*Primary Examiner*—Thomas H. Tarcza
*Assistant Examiner*—Daniel T. Pihulic
*Attorney, Agent, or Firm*—Robert F. Beers; Henry Hansen; Vincent T. Pace

[57] ABSTRACT

A low cost sonobuoy is constructed of plastic pipe and fittings. A simple design is used comprising a section of plastic pipe and two end caps. One end cap is tapered and adapted for having an antenna mounted thereon. The other end cap has a recess for storing a hydrophone, cable and plastic streamers. The hydrophone and cable are held in place by water soluble tape. The sonobuoy may be launched from aircraft and thus the plastic streamers trail from the second end cap to provide in-air stability. The sonobuoy is designed to be self-righting and self-scuttling.

3 Claims, 4 Drawing Figures

LOW COST SONOBUOY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to sonobuoys and more particularly to a low cost sonobuoy assembly suitable for air launching which automatically deploys upon immersion in water and which is self-scuttling.

Conventional sonobuoys used in antisubmarine warfare have fairly complex mechanical systems. For example, the housing of these sonobuoys usually consists of metal tubing. This metal tubing must be machined and fitted with hardware for parachute attachment, hydrophone deployment means, external fittings for handling and for control of the electronic components, and means for mounting an antenna. Also, special watertight seals must be used in capping the ends of sonobuoys with such metal casings.

All of these requirements and operations result in a relatively high unit cost. If the unit cost of a sonobuoy could be lowered, substantial monetary savings would result since approximately 200,000 sonobuoys are expended each year.

Furthermore, a reduction in mechanical complexity and in the number of parts required could result in greater reliability. Simpler designs are inherently more reliable.

SUMMARY OF THE INVENTION

Accordingly, one object of this invention is to simplify the design and construction of expendable sonobuoys.

Another object of this invention is to reduce the unit cost of sonobuoys.

A further object of this invention is to increase the reliability of sonobuoys.

The above and other objects are realized in the subject invention by a sonobuoy which has a housing constructed of prefabricated plastic components such as polyvinyl chloride (PVC) pipe and fittings. More specifically, the sonobuoy housing is made of a section of plastic pipe having end caps bonded to either end. One of the end caps is adapted for having an antenna mounted thereon. The other end cap has a recess disposed therein for containing a hydrophone and its associated cable. An opening in this end cap provides access for the hydrophone cable to the interior of the sonobuoy. Prior to deployment the hydrophone and cable are held in place by water soluble tape.

The sonobuoy is designed to be dropped from an airplane. Plastic streamers which trail from the access end cap provide aerodynamic stabilization of the sonobuoy during descent. A center of gravity design slightly above the mid-section assures that the sonobuoy will invert, thereby premitting hydrophone release and proper antenna orientation.

Other advantages and novel features will become apparent from the detailed description of the invention which follows the drawings, wherein:

DESCRIPTION OF THE PREFERRED EMBODIMENT

Figure 1:
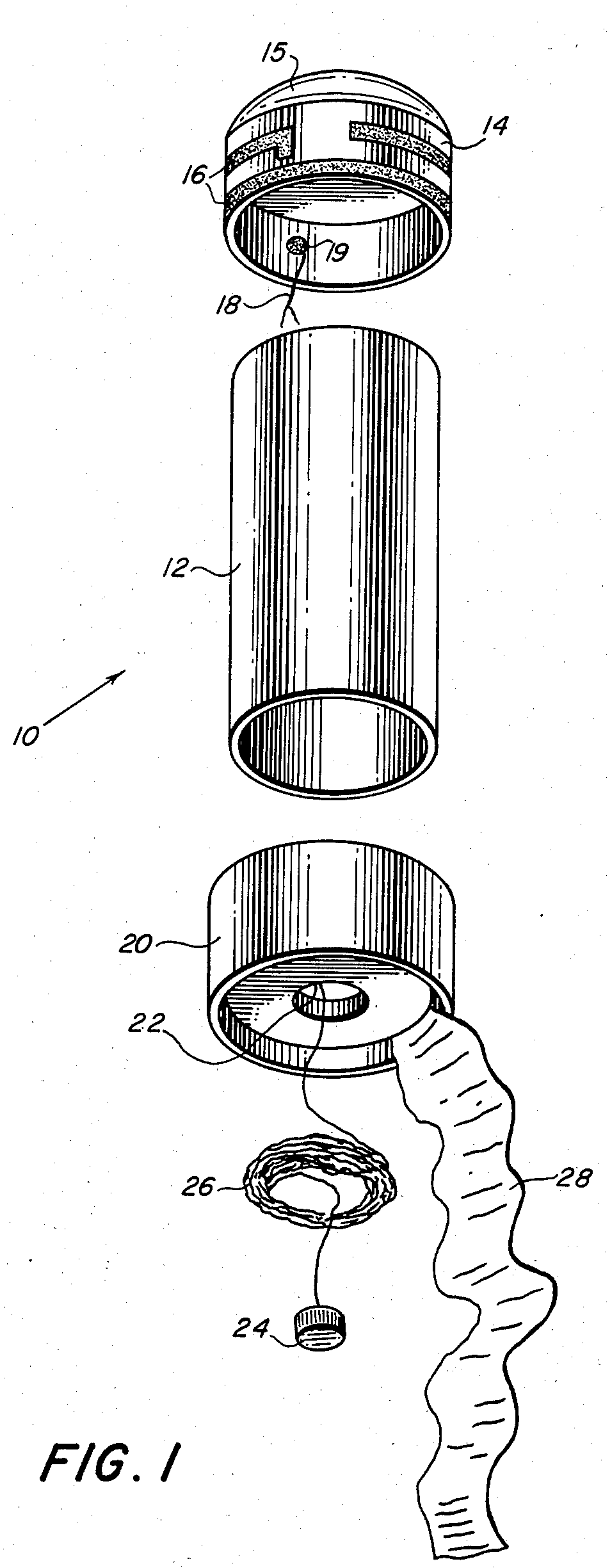
FIG. 1 is an exploded view of a sonobuoy according to the invention.
Figure 2:
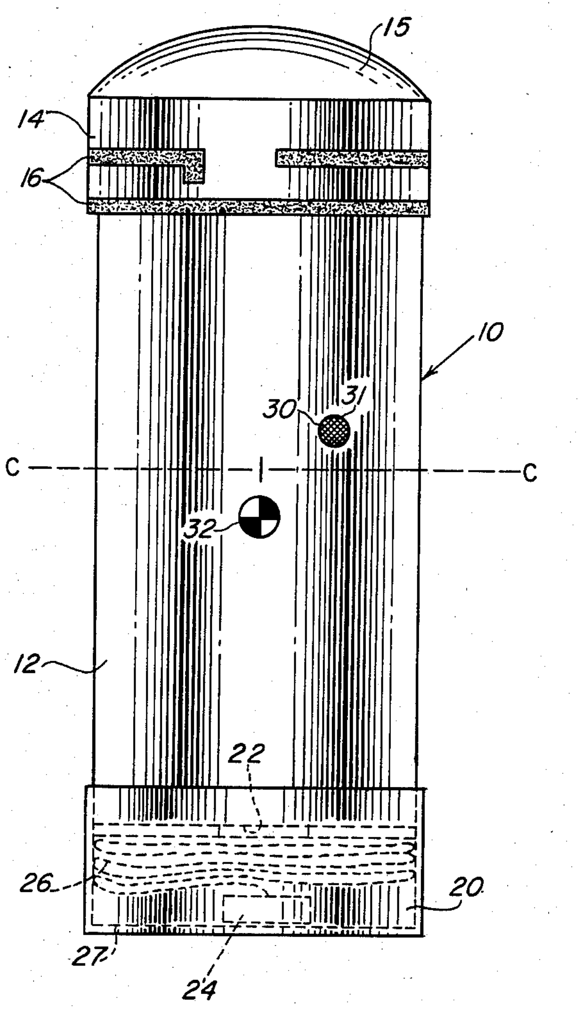
FIG. 2 shows the sonobuoy of FIG. 1 illustrating the pre-deployment assembly thereof.

Referring now to the drawings wherein like reference numerals designate the same or similar parts across the several views, and in particular to FIGS. 1 and 2, there is shown a preferred embodiment of a low-cost sonobuoy 10 according to the invention. Sonobuoy 10 includes a plastic housing 12 which may be constructed of some high strength, water impermeable plastic pipe, such as PVC or Lexan. It is contemplated that housing 12 be formed of a standard piece of pipe having sufficient volume to enclose the radio, electronic processing, and power supply components (not shown). These components would be mounted in some type of resilient, shock absorbing material in housing 12.

A tapered end cap 14 is bonded to one end of housing 12 in such a manner as to make a watertight seal. End cap 14 would consist of a standard plastic pipe cap having a tapered face 15. The tapered face 15 helps to reduce the shock to the sonobuoy 10 when it impacts on the water.

End cap 14 is equipped with a radio antenna 16 about its circumference. Antenna 16 would generally consist of a conductive metal deposit or print, such as copper, on a mylar or similar plastic sheet. Antenna 16 could also be molded into the plastic housing 12. Antenna 16 is easily affixed or bonded to the cylindrical surface of end cap 14, either internally or externally. If mounted externally, then antenna leads 18 are brought into the interior of sonobuoy 10 by means of a sealable opening 19. It is also contemplated that antenna 16 could comprise a collapsible whip antenna which would be folded during descent, but which would unfold to an operating position shortly after impact with the water.

A second end cap 20 is similarly bonded to the other end of housing 12. End cap 20 is made of the same material as housing 12 and end cap 14. However, unlike end cap 14 it is recessed and has a central opening 22. As shown in FIG. 2 the recess in end cap 20 has sufficient volume to store a hydrophone 24 and its associated cable 26. Opening 22 provides access for cable 26 to the interior of sonobuoy 10. Prior to deployment hydrophone 24 and cable 26 are held in place by a water soluble tape 26, such as polyvinyl alcohol.

An opening 30 is provided in housing 12 to provide access to a test plug after the sonobuoy 10 has been assembled. Opening 30 is sealed with a water soluble material 31, such as a salt plug, which enables the sonobuoy 10 to be self-scuttling. The soluble material 31 has a predetermined solubility time constant so that sufficient material may be used to permit scuttling only after the sonobuoy 10 has completed its mission.

Sonobuoy 10 has a center of gravity 32 located between the mid-section of housing 12, designated by line C—C, and end cap 20. This location of the center of gravity 32, assures that sonobuoy 10 will properly align itself after water impact. To be properly aligned the antenna 16 would be above the water surface and the hydrophone 24 would be below.

Figure 3:
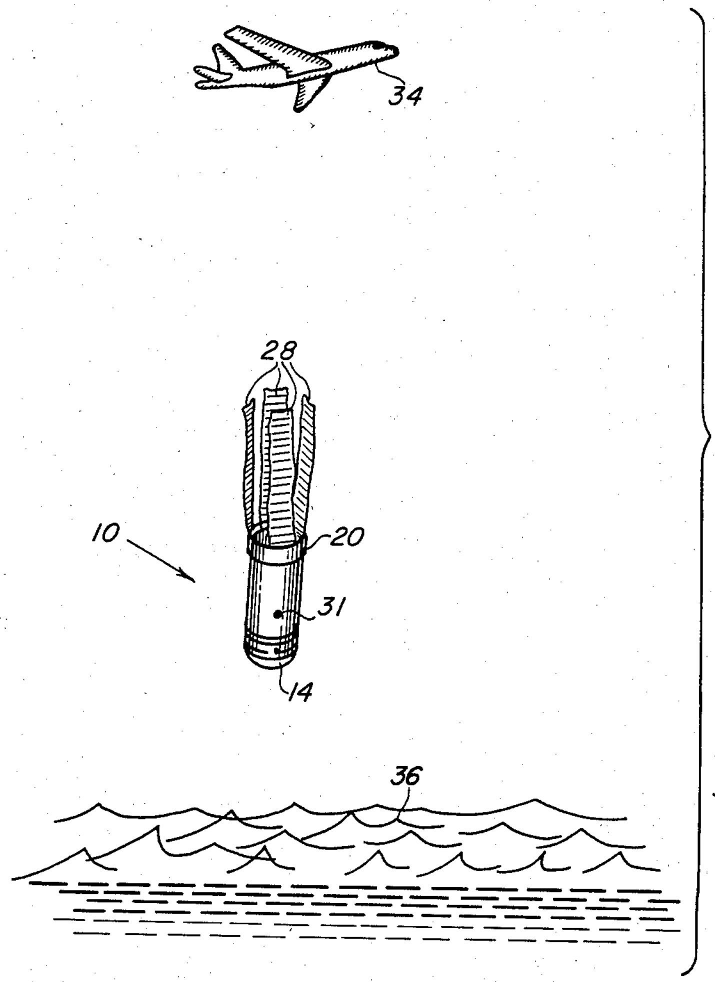
FIG. 3 shows the sonobuoy of FIG. 1 being deployed form an aircraft.
Figure 4:
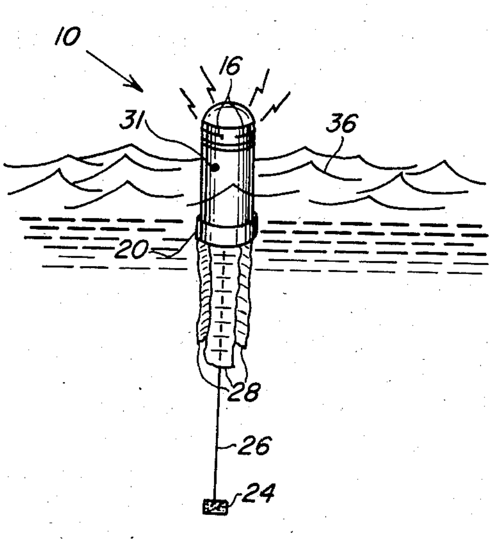
FIG. 4 shows the sonobuoy of FIG. 3 in a fully deployed and operational state.

Referring now to FIGS. 3 and 4 there is shown the preferred method of deploying sonobuoy 10. The sonobuoy 10 may be dropped from an aircraft 34. In so doing, sonobuoy 10 descends with tapered end cap 14 directed downward, toward the water 36. A plurality of plastic streamers 28 are attached to end cap 20 and trail behind the descending sonobuoy 10 to provide in-air stability. As best seen in FIG. 1, streamers 28 are attached around the periphery of the recess of end cap 20. Although there are four (4) streamers shown in the embodiment of FIG. 3, other arrangements could be utilized.

After impact with the water 36, the sonobuoy 10 inverts due to the effect of the center of gravity 32. As shown in FIG. 4 antenna 16 is above the water 36 and the hydrophone 24 and its cable 26 are released from end cap 20. The plastic streamers 28 remain attached to the sonobuoy 10. The sonobuoy 10 remains floating until the water soluble plug 31 dissolves allowing sea water to enter the sonobuoy 10 thereby scuttling it.

Some of the many advantages and novel features of the above disclosed invention should now be apparent in view of the foregoing description. For example, a novel, expendable sonobuoy has been described having a very simple design and constructed of low cost, standard materials. The sonobuoy is self-deploying and it does not need to separate to deploy. This simpler design will reduce the unit cost as well as improve reliability.

Numerous additional modifications and variations of the subject invention are possible in light of the above teachings. It is therefore to be understood that within the scope of the appended claims, the invention may be practiced otherwise than as specifically described herein.

What is claimed is:

1. A sonobuoy of the type for being launched from an aircraft and floatingly deployed in water, comprising:

a plastic casing having a generally cylindrical shape with closed ends formed for housing electronic processing and transmitting components;

a radio antenna formed to be mounted on one end of said casing, said radio antenna formed to be operatively connected to the electronic processing and transmitting components;

hydrophone means deployably stowed in a recess in the other end of said casing and formed to be operatively connected to said electronic processing and transmitting components for providing an acoustic signal thereto;

stablizing means deployed from the end of said casing which stores said hydrophone means, for aerodynamically stabilizing the sonobuoy during its descent from the aircraft, said stabilizing means including a plurality of flexible strips contiguously and permanently attached at one end to said casing end and formed for trailing from said sonobuoy; and means for orienting the sonobuoy after immersion such that said radio antenna is above the water surface and said hydrophone means is below the water surface.

2. A sonobuoy as recited in claim 1 wherein said strips are attached around the periphery of said casing end.

3. A low cost, air launched sonobuoy suitable for immersion in water, comprising:

a section of plastic pipe;

a first plastic end cap formed to be nonseparably bonded to one end of said plastic pipe section, said first end cap having a tapered face;

a radio antenna formed to be affixed to said first end cap;

a second plastic end cap formed to be nonseparably bonded to the other end of said plastic pipe section, said second end cap having a recess and a central opening;

hydrophone means deployably positioned within the recess of said second end cap;

a plurality of flexible strips, each contiguously and permanently attached at one end around the periphery of said second end cap and formed for trailing from said sonobuoy during descent thereby providing in-air stability;

electrical component means enclosed within said plastic pipe section and operatively connected between said hydrophone means and said radio antenna for processing and transmitting detected acoustic signals; and means for orienting said sonobuoy such that said radio antenna is above the water surface and said second end cap is below the water surface.

* * * * *